United States Patent
Messick, Jr. et al.

(10) Patent No.: US 7,494,005 B2
(45) Date of Patent: Feb. 24, 2009

(54) VARIABLE SPACED CONVEYOR BELT

(75) Inventors: George H. Messick, Jr., E. New Market, MD (US); Robert E. Maine, Jr., Hebron, MD (US)

(73) Assignee: Cambridge International, Inc., Cambridge, MD (US)

( * ) Notice: Subject to any disclaimer, the term of this patent is extended or adjusted under 35 U.S.C. 154(b) by 138 days.

(21) Appl. No.: 11/529,596

(22) Filed: Sep. 29, 2006

(65) Prior Publication Data

US 2007/0080048 A1  Apr. 12, 2007

Related U.S. Application Data

(60) Provisional application No. 60/722,003, filed on Sep. 30, 2005.

(51) Int. Cl.
*B65G 15/54* (2006.01)
(52) U.S. Cl. .................................. 198/848; 198/849
(58) Field of Classification Search ............. 198/848, 198/849, 850, 851, 852, 853
See application file for complete search history.

(56) References Cited

U.S. PATENT DOCUMENTS

| | | | |
|---|---|---|---|
| 2,862,602 A | 12/1958 | Greer et al. | |
| 2,872,023 A | 2/1959 | Bachtel, Jr. | |
| 3,439,795 A | 4/1969 | Roinestad et al. | |
| RE27,690 E * | 7/1973 | Roinestad et al. | 198/852 |
| 3,977,514 A * | 8/1976 | Kaess | 198/853 |
| 4,222,483 A | 9/1980 | Wootton et al. | |
| 4,276,980 A * | 7/1981 | Oizumi | 198/851 |
| 4,846,339 A * | 7/1989 | Roinestad | 198/852 |
| 4,972,942 A | 11/1990 | Faulkner | |
| 5,031,757 A | 7/1991 | Draebel et al. | |
| 5,065,860 A * | 11/1991 | Faulkner | 198/848 |
| 5,141,099 A | 8/1992 | Baumgartner | |
| 5,174,439 A | 12/1992 | Spangler et al. | |
| 5,190,143 A | 3/1993 | Froderberg et al. | |
| 5,215,185 A | 6/1993 | Counter et al. | |
| 5,265,715 A | 11/1993 | Yoshimura et al. | |
| 5,271,491 A | 12/1993 | Irwin | |
| 5,335,768 A * | 8/1994 | Schladweiler | 198/853 |
| 5,431,275 A | 7/1995 | Faulkner | |
| 5,501,319 A | 3/1996 | Larson et al. | |
| 5,697,492 A | 12/1997 | Damkjaer | |
| 5,906,270 A | 5/1999 | Faulkner | |
| 5,921,379 A * | 7/1999 | Horton | 198/852 |
| 5,934,448 A | 8/1999 | Kucharski et al. | |

(Continued)

FOREIGN PATENT DOCUMENTS

DE  15 31 060 A1  8/1969

(Continued)

*Primary Examiner*—James R Bidwell
(74) *Attorney, Agent, or Firm*—Buchanan Ingersoll & Rooney PC

(57) ABSTRACT

A variable spaced conveyor belt includes a plurality of spaced tractive rods and a plurality of rows of wickets transversely disposed with respect to a direction of travel and interconnecting the plurality of spaced tractive rods, each of the rows of wickets including a plurality of first links and a plurality of second links, the plurality of first links have a first spacing and the plurality of second links have a second spacing, the first spacing being less than the second spacing.

11 Claims, 5 Drawing Sheets

U.S. PATENT DOCUMENTS

| | | |
|---|---|---|
| 5,954,187 A | 9/1999 | Hager |
| 6,202,833 B1 | 3/2001 | Greer |
| 6,213,292 B1 * | 4/2001 | Takahashi et al. ........... 198/853 |
| 6,325,205 B1 * | 12/2001 | Heyde ........................ 198/835 |
| 6,390,285 B2 | 5/2002 | de Geus et al. |
| 6,530,469 B2 * | 3/2003 | Messick, Jr. ................ 198/848 |
| 6,615,979 B2 | 9/2003 | Etherington et al. |
| 6,766,901 B2 * | 7/2004 | Guldenfels et al. .......... 198/837 |
| 6,854,590 B2 | 2/2005 | Rudy et al. |
| 7,108,126 B2 * | 9/2006 | Layne et al. ................. 198/852 |
| 2001/0017254 A1 * | 8/2001 | Geus et al. .................. 198/853 |
| 2003/0024794 A1 * | 2/2003 | Etherington et al. ........ 198/850 |

FOREIGN PATENT DOCUMENTS

| | | |
|---|---|---|
| WO | WO 92/05096 A | 4/1992 |
| WO | WO 98/06648 A | 2/1998 |
| WO | WO 00/34159 A | 6/2000 |

* cited by examiner

VARIABLE SPACED CONVEYOR BELT

FIELD OF THE INVENTION

The present invention is directed to a conveyor belt, more particularly to a conveyor belt having a variable spaced wire links, and still more particularly, to a flat wire conveyor belt having variable spaced wire links.

BACKGROUND OF THE INVENTION

With reference to FIG. 1, when a flat wire conveyor belt 10 is used in a spiral system or turn, tension is carried on the outer edge 12 of belt 10 by reinforcing bars 14. The wickets 16 on belt 10 are for product support, rather than taking a load, and the rods 18 are utilized to hold the components of belt 10 together, and to transmit drive forces to the outside edge 12 of belt 10.

In a straight run, such as the infeed and discharge areas of a spiral system, the outer reinforcing bars 14 have little if any effect on the function of belt 10. A sprocket 20 tooth, which engages rods in a straight transport course downstream of a course turn, causes rod 18 to deflect at sprocket 20, releasing tension from the outside edge 12 of belt 10. This causes wickets 16, whose purpose is for product support, to now take the tension of the belt 10. The sprocket-engagement area 22 of rod 18 takes tension from sprocket 20 and applies it to adjacent wicket areas 24 to cause wicket fatigue and breakage at one or more of wicket areas 24 where rod 18 meets wickets 16.

Fatigue breakage at one or more of wicket areas 24 of a flat wire conveyor belt is a function of the number of cycles that a particular area 24 is flexed. Failure of a wicket can be accelerated by adding tension thereto. Two areas where a flat wire conveyor belt such as shown in FIG. 1 has the most tension is on the outer edge 12 of belt 10 and in the sprocket-engagement area 22 of belt 10. When rod 18 flexes to distribute the tension or load, wicket 16 also is flexed until tension is transferred from the edge 12 to the engagement location of sprocket 20. Thus, it is believed that such flexing causes wicket breakage.

The use of reinforcing bars 14 on the outer edge of the conveyor belt is not entirely successful in eliminating fatigue failures on the outer edge 12. Accordingly, further design improvements have been made, such as described in U.S. Pat. No. 5,934,448 assigned to Cambridge International, Inc., the contents of which are hereby incorporated by reference. According to one preferred embodiment of the '448 patent, a split between the links is formed in each row of wickets, and a tension link is positioned within each split therebetween. The tension links are formed of heavier gauge material than the material from which the wickets are formed, and preferably have a thickness which is about two to about four times thicker than the wicket thickness. Each tension link is a generally U-shaped member, wherein a base portion of the U-shaped tension link contacts one rod, and two leg portions of the U-shaped tension link contact an adjacent rod in the succession of rods. The tension links can also be between pairs of reinforcing bars.

While the conveyor belt of the '448 patent exhibits outstanding performance and has enjoyed substantial commercial success, the use of heavier gauge material for the tension links substantially increases the overall costs of manufacturing the belt. Accordingly, there exists a need in the marketplace for a flat wire conveyor belt having a lighter weight and reduced quantity of required material; thus reducing the cost, while still retaining its strength in a turn configuration.

SUMMARY OF THE INVENTION

These and other objects are met by a variable spaced conveyor belt includes a plurality of spaced tractive rods and a plurality of rows of wickets transversely disposed with respect to a direction of travel and interconnecting the plurality of spaced tractive rods. Each of the rows of wickets includes a plurality of first links and a plurality of second links, the plurality of first links having a first spacing and the plurality of second links having a second spacing. In a preferred embodiment, the spacing of the first links is less than the spacing of the second links such that the edges of the conveyor belt are more dense, heavier, and stronger, and thus able to withstand the tension applied thereto without fatigue.

BRIEF DESCRIPTION OF THE DRAWING FIGURES

These and other objects, features, and advantages of the present invention will become more readily apparent to those skilled in the art upon reading the following detailed description, in conjunction with the appended drawings in which.

DETAILED DESCRIPTION OF THE PREFERRED EMBODIMENTS

Figure 1:
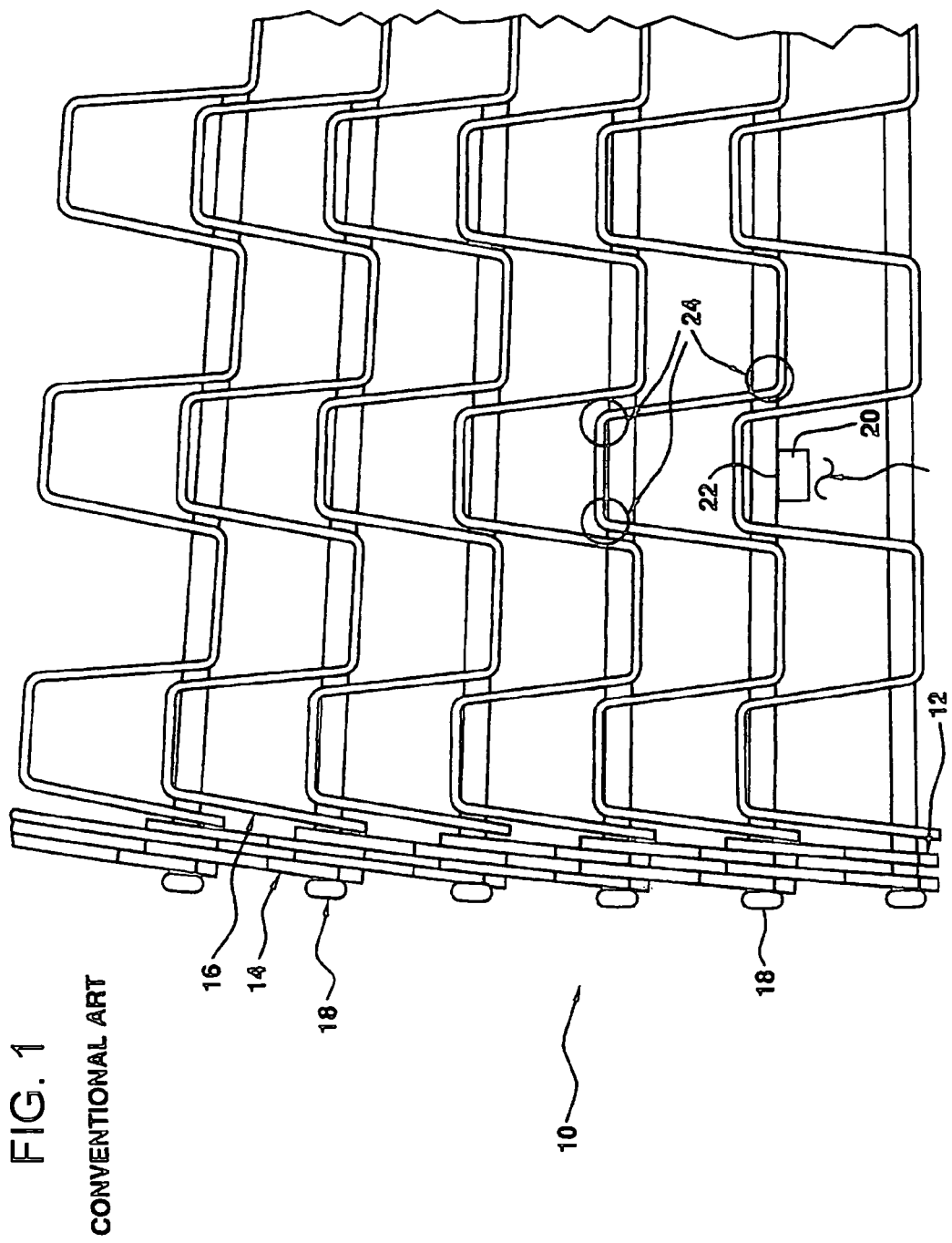
FIG. 1 is a top elevational view, partly schematic and with portions broken away, of a segment of a conventional flat-wire conveyor belt.
Figure 2:
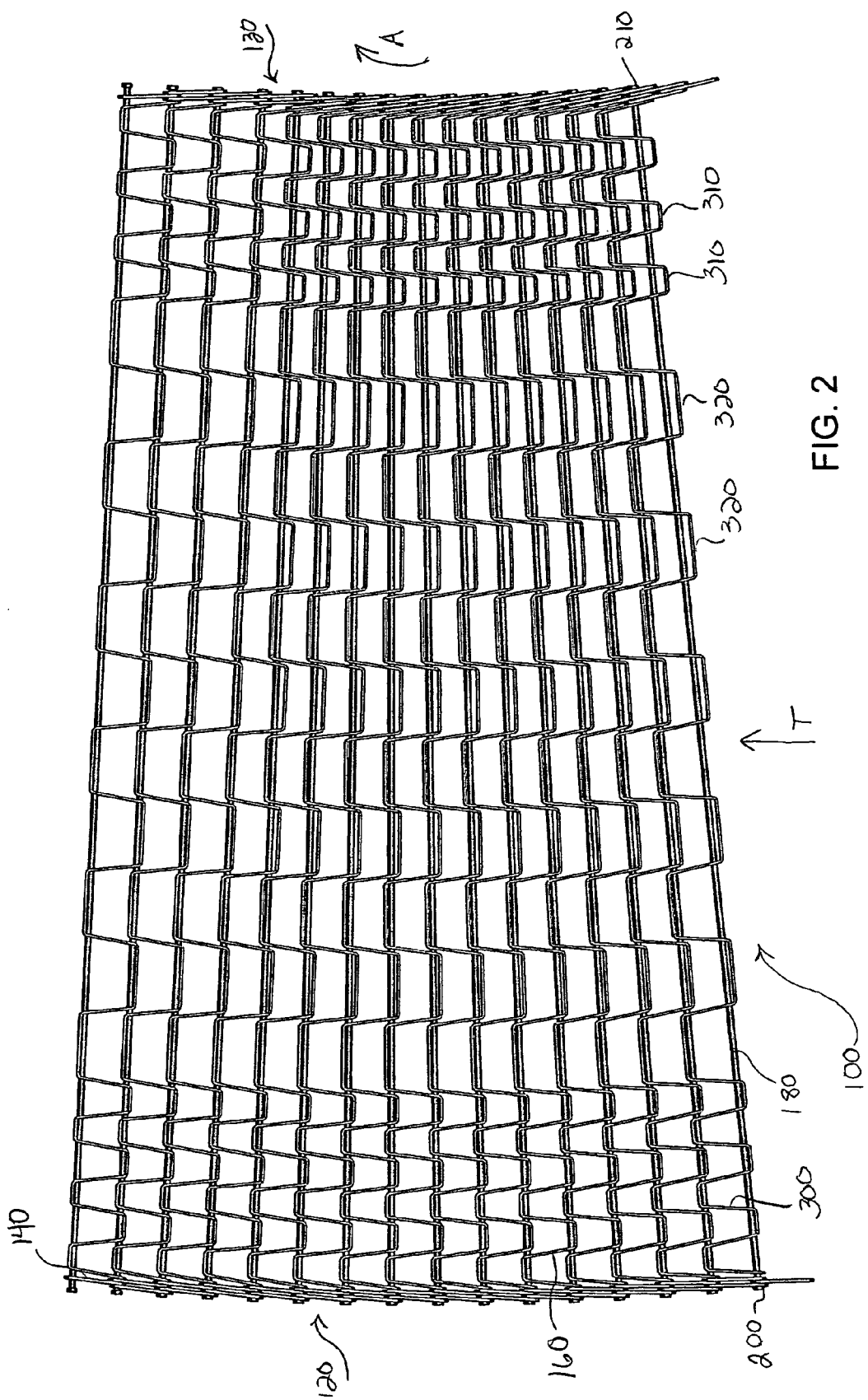
FIG. 2 is a top elevational view of a flat-wire conveyor belt according to a preferred embodiment of the present invention.

A conveyor belt in accordance with the present invention is shown generally in FIG. 2 by reference numeral 100. Conveyor belt 100 preferably comprises a flat wire conveyor belt including a plurality of spaced tractive rods 180 disposed in succession and transversely with respect to a direction of travel T as represented by arrow T of belt 100, each rod 180 having two ends 200 and 210.

Belt 100 has a transport course preferably including at least one course turn deviating in a direction selected from the group consisting of a left course turn and a right course turn. When belt 100 is in a right course turn as represented by arrow A, belt 100 has an outside edge 120 and an inside edge 130. Belt 100 also has a straight transport course, also exemplified by arrow T, which is generally downstream of a left or right course turn of belt 100.

Belt 100 includes a plurality of rows of wickets 160 transversely disposed with respect to the direction of travel T, and interconnecting the succession of rods 180. Each row of wickets 160 is comprised of a plurality of links 300, each link connecting a rod 180 with a following rod in the succession. In addition, belt 100 preferably includes at least one row of reinforcing bars 140 disposed along each edge 120, 130 of the conveyor belt. Belt 100 may be manufactured, however, without any reinforcing bars or alternatively, several rows of reinforcing bars may be provided, depending upon the particular application.

In accordance with a first preferred embodiment of the present invention, wickets 160 comprise a plurality of links 300; however, not all the links 300 within a single wicket are identical. More particularly, in order to strengthen the outer tension-receiving edges of the conveyor belt, the edges 120, 130 of the wicket are provided with links 310 having a first spacing or mesh size and the middle portion of the belt therebetween is provided with links 320 having a second spacing or mesh size. The exact number of links 310 or mesh openings on each end of the wicket may vary depending upon the weight of the belt and other conditions. By way of example, wicket 160 shown in FIGS. 2-4 includes links 310 defining six open mesh areas on each end of the wicket whereas wickets 160' and 160" shown in FIGS. 5 and 6, respectively, include links 310 defining five open mesh areas on each end thereof. Preferably, the denser mesh formed by links 310 will extend approximately 3-6 inches, and more preferably approximately 4-5 inches, along each end, although greater or lesser amounts would also be feasible with lesser degrees of success.

Figure 3:
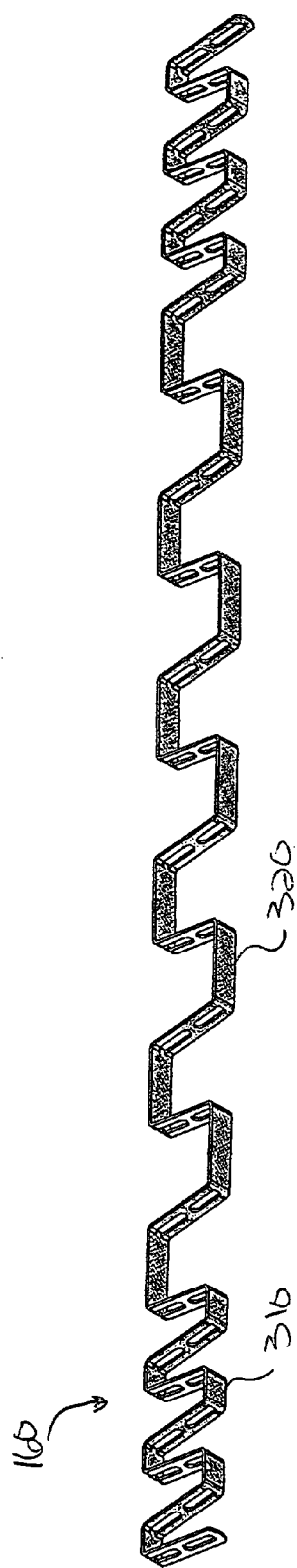
FIG. 3 is a perspective view of a single wicket in the conveyor belt shown in FIG. 2.
Figure 4:
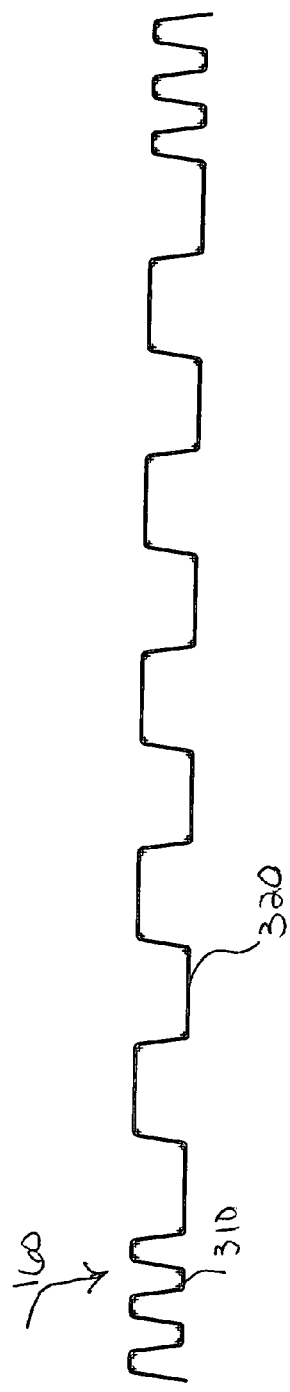
FIG. 4 is a top view of the single wicket shown in FIG. 2.

In a preferred embodiment, the spacing of the links 310 is less than the spacing of the links 320 such that the edges of the conveyor belt are more dense, heavier, and stronger, and thus able to withstand the tension applied thereto without fatigue. As shown in FIGS. 2-4, links 310 are formed, preferably, having a conventional 1×1 spacing, that is, the mesh opening defined by the links 310 is 1" in the lateral direction and 1" in the longitudinal direction. On the other hand, links 320 are spaced further apart in a 2×1 pattern, that is, the opening defined by the links 320 is 2" in the lateral direction and 1" in the longitudinal direction. By spacing the links in the middle portion further apart, the weight of the wicket is reduced and thus, the overall weight and material need for the conveyor belt are reduced. Although the 2×1 pattern is illustrated for links 320, one skilled in the art will recognize that 3×1, 4×1 and other spacing patterns could be used to even further reduce the weight of the belt. Similarly, while the 1×1 pattern is illustrated for links 310, a conventional ½×1 pattern could also be used depending upon the fatigue conditions, or still further, any mesh opening between the ½×1 and the 1×1 could be used.

Figure 5:
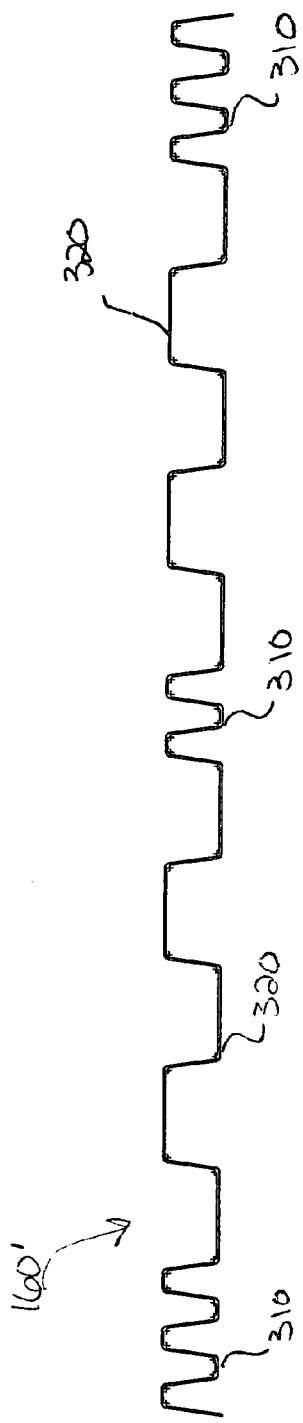
FIG. 5 is a top view of a single wicket according to a second preferred embodiment of the present invention.

Referring to FIG. 5, a further preferred embodiment of a wicket 160' is illustrated, wherein in addition to having links 310 disposed on each edge 120, 130, one or more links 310 are disposed in the middle region of the wicket. Conveyors generally may have linear rail supports underneath the conveyor belt on both ends of the belt and in the middle of the belt. By providing one or more of the denser, more closely spaced links 310 in the middle of the wicket 160', the weight of the overall conveyor belt is not significantly increased and the denser links 310 are able to assist in reducing wear to the wickets as the belt passes over the middle rail support.

Figure 6:
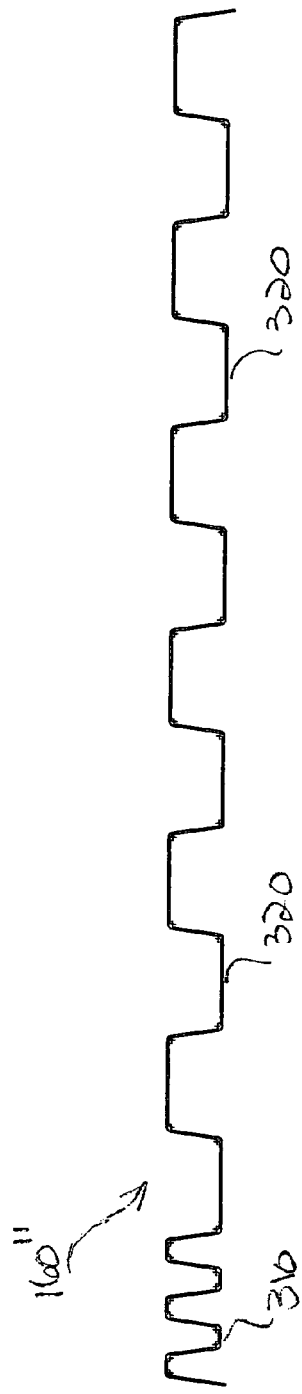
FIG. 6 is a top view of a single wicket according to a third preferred embodiment of the present invention.

Alternatively, if the conveyor belt is intended to follow a transport course preferably including only one course turn, i.e., a left course turn or a right course turn, then only one edge of the conveyor belt will be subjected to tension forces and hence, wicket 160" need only include links 310 on one edge thereof, as illustrated in FIG. 6.

Figure 7:
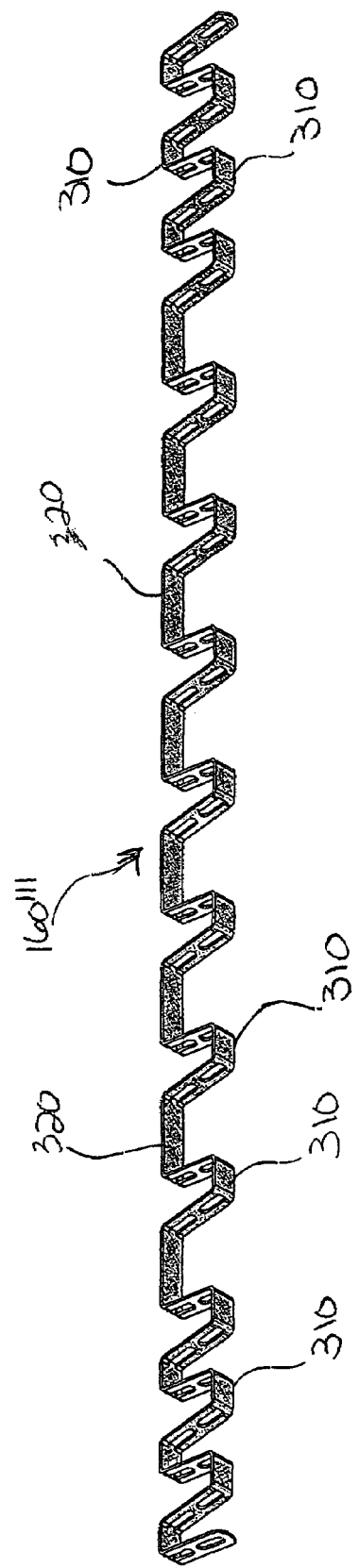
FIG. 7 is a perspective view of a single wicket according to a fourth preferred embodiment of the present invention.

FIG. 7 illustrate a yet further preferred embodiment of the present invention, wherein wicket 160''' includes links 310 on each edge 120, 130, and the middle portion therebetween alternates between a link 310 and a link 320. Providing alternating spaced links in the middle portion of the belt and similar spaced links on at least one edge of the belt, still reduces the weight of the conveyor belt as compared to a conventional 1×1 belt without sacrificing strength.

The above-described embodiments illustrate preferred relationships between links within a wicket. Such descriptions are not limited to the illustrated lineal pitch, and can of course be used with any desired pitch. Similarly, the wickets and hence the conveyor belts can be manufactured to any preferred width depending upon the desired application. During the manufacturing process of the conveyor belt 100, each wicket will have fixed openings in the wicket, i.e., the even numbered openings, and variable openings, i.e., the odd numbered openings, that may be adjusted slightly in order to meet the customer demands. More particularly, the openings of all the links 310 are referred to as 1×1, yet the odd numbered links 310 may in actuality be 0.75×1 or 1.2×1 in order to render a finished conveyor belt having the desired width. Thus, for purposes of the present invention, links 310 are understood to be substantially similar is spacing even though manufacturing constraints may require slight variations from the specified width. This of course also applies to links 320.

While the present invention has been described with respect to a particular embodiment of the present invention, this is by way of illustration for purposes of disclosure rather than to confine the invention to any specific arrangement as there are various alterations, changes, deviations, eliminations, substitutions, omissions and departures which may be made in the particular embodiment shown and described without departing from the scope of the claims.

What is claimed is:

1. A variable spaced flat wire conveyor belt comprising:
   a plurality of spaced tractive rods;
   a plurality of rows of flat wire wickets transversely disposed with respect to a direction of travel and interconnecting said plurality of spaced tractive rods, each said wicket having a uniform thickness dimension throughout a width of the conveyor belt;
   each of said rows of wickets defining a plurality of first links and a plurality of second links, each of said links having a longitudinal height and a transverse spacing;
   wherein said plurality of first links have a first height and a first transverse spacing and said plurality of second links have a second height and a second transverse spacing, said first height being substantially egual to said second height and said first spacing being less than said second spacing, and
   wherein said conveyor belt includes opposing first and second outer edges and said plurality of first links are disposed on at least one of the first and second outer edges of the flat wire conveyor belt, said first links thereby strengthening said at least one outer edge for receiving tension during use.

2. The conveyor belt of claim 1 wherein each said wicket includes alternating first links and second links extending from said at least one edge portion to an opposing edge portion of said wicket.

3. The conveyor belt of claim 1 wherein said plurality of first links are disposed on both said opposing first and second outer edges of the conveyor belt and said plurality of second links are disposed therebetween so as reduce an overall weight of said conveyor belt and increase airflow.

4. The conveyor belt of claim 1 wherein each said wicket includes alternating first links and second links disposed between said opposing first and second outer edges of the conveyor belt.

5. The conveyor belt of claim 1 wherein said first plurality of links extend approximately 3-6 inches along each outer edge of the conveyor belt.

6. The conveyor belt of claim 3 wherein said first plurality of links extend approximately 4-5 inches along each outer edge of the conveyor belt.

7. The conveyor belt of claim 1 wherein said first plurality of links are disposed on opposing first and second outer edges of the conveyor belt and in a middle region of each said wicket.

8. The conveyor belt of claim 1 wherein said first spacing is defined by a 1×1 mesh and said second links is defined by a 2×1 mesh.

9. The conveyor belt of claim 1 wherein said first spacing is defined by a mesh between ½×1 and 1×1.

10. The conveyor belt of claim 1 wherein said second spacing is defined by a mesh between 1×1 and 4×1.

11. The conveyor belt of claim 1 further comprising at least one row of reinforcing bars disposed along at least one outer edge of the conveyor belt.

* * * * *